(12) United States Patent
Planki et al.

(10) Patent No.: US 7,702,965 B1
(45) Date of Patent: Apr. 20, 2010

(54) METHOD AND DEVICE FOR MONITORING AND CONTROLLING THE OPERATIONAL PERFORMANCE OF A COMPUTER SYSTEM OR PROCESSOR SYSTEM

(76) Inventors: Peter Planki, Herzog-Heinrich-Strasse 25, Munich (DE) 80336; Karl-Heinz Lettmair, Sportplatzstr. 26, Stoffen (DE) 86932

( * ) Notice: Subject to any disclaimer, the term of this patent is extended or adjusted under 35 U.S.C. 154(b) by 753 days.

(21) Appl. No.: 10/070,528

(22) PCT Filed: Sep. 6, 2000

(86) PCT No.: PCT/EP00/08704

§ 371 (c)(1),
(2), (4) Date: Dec. 2, 2002

(87) PCT Pub. No.: WO01/18632

PCT Pub. Date: Mar. 15, 2001

(30) Foreign Application Priority Data

Sep. 6, 1999 (DE) .................. 199 42 430

(51) Int. Cl.
*G06F 11/00* (2006.01)
(52) U.S. Cl. ........................................ 714/47
(58) Field of Classification Search .................. 714/47; 702/121, 132
See application file for complete search history.

(56) References Cited

U.S. PATENT DOCUMENTS

| 5,500,940 | A | * | 3/1996 | Skeie ........................... 714/25 |
| 5,781,434 | A | * | 7/1998 | Tobita et al. ................... 700/79 |
| 5,878,377 | A | * | 3/1999 | Hamilton et al. ............. 702/132 |
| 6,029,119 | A | * | 2/2000 | Atkinson ..................... 702/132 |
| 6,088,816 | A | * | 7/2000 | Nouri et al. .................... 714/31 |
| 6,349,385 | B1 | * | 2/2002 | Kaminski et al. ........... 713/300 |
| 6,633,782 | B1 | * | 10/2003 | Schleiss et al. ............... 700/26 |
| 6,879,931 | B2 | * | 4/2005 | Smith et al. ................. 702/150 |
| 6,934,658 | B2 | * | 8/2005 | Clabes et al. ............... 702/132 |
| 6,937,958 | B2 | * | 8/2005 | Gold et al. .................. 702/132 |
| 7,123,995 | B1 | * | 10/2006 | Desai et al. ................. 700/299 |

* cited by examiner

*Primary Examiner*—Joshua A Lohn
(74) *Attorney, Agent, or Firm*—Sonnenschein Nath & Rosenthal LLP; Bryan P. Stanley

(57) ABSTRACT

In order to monitor and control the operational performance of a computer system or processor system (1), operational parameters of individual components as well as environmental parameters of the computer system or processor system (1) are detected. Said parameters are compared with predetermined limit values. If it is determined that one or more of the detected operational parameters and environmental parameters have exceeded or fallen below of the predetermined limit values, an operational event is determined based on the limit values that have been exceeded or fallen bellow of. A reaction is selected from a number of predetermined reaction patters according to the determined operational event, and a control command which corresponds to this reaction and which is provided for altering the operational performance is transmitted to the computer to be monitored. This enables an early detection of the occurrence of faults as well as the initiation of an appropriate measure.

20 Claims, 4 Drawing Sheets

Figure 1:
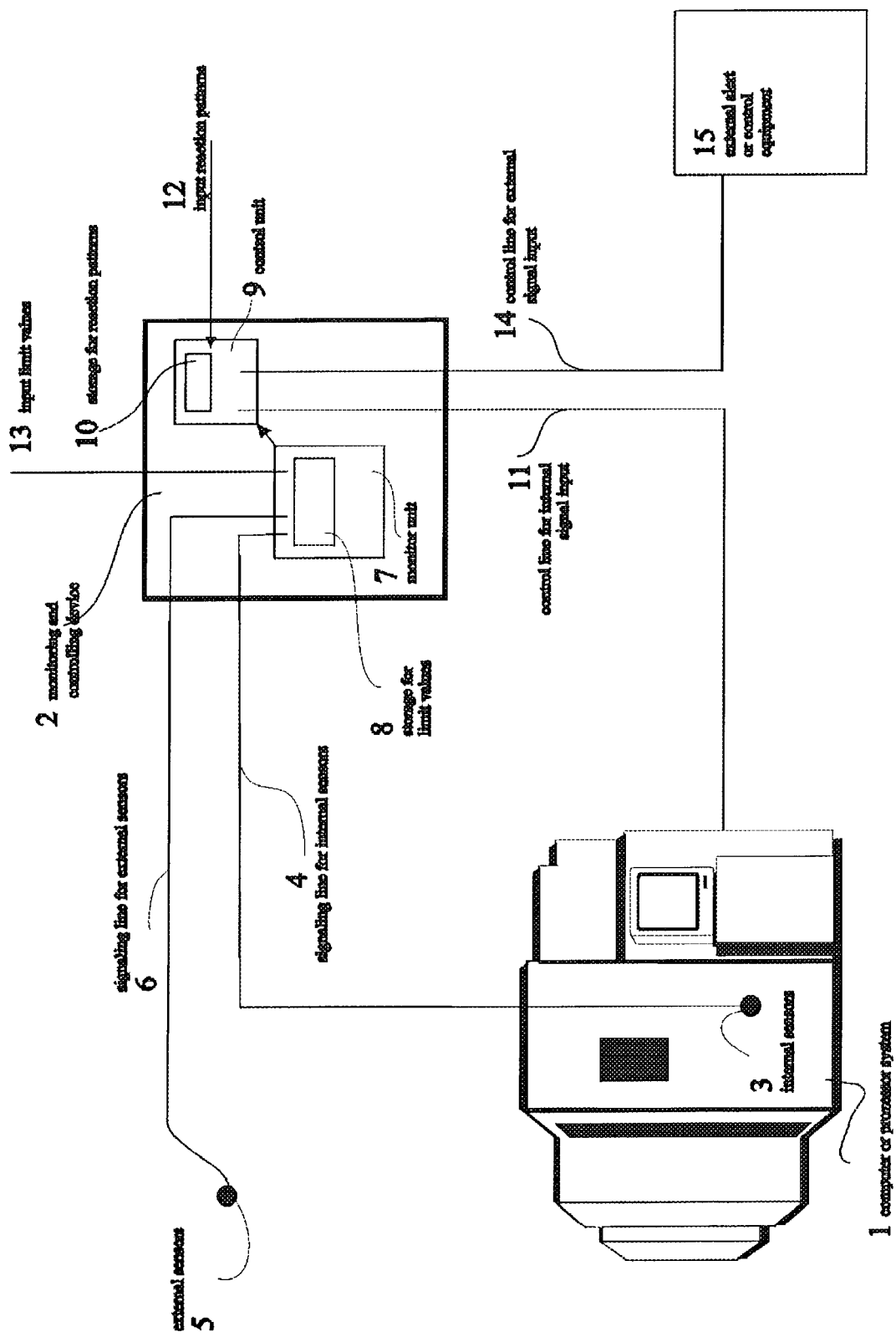

METHOD AND DEVICE FOR MONITORING AND CONTROLLING THE OPERATIONAL PERFORMANCE OF A COMPUTER SYSTEM OR PROCESSOR SYSTEM

The present invention relates to a method and device for monitoring and controlling the operational performance of a computer or processor system and a device for accomplishing this method.

Serviceability and operational reliability of components, assembly groups, devices and hence a computer or processor system as a whole is only protected within certain tolerance zones of physical values in their environment. These physical values are particularly temperature, but also air humidity, air flow, freedom of dust and percussions. Depending upon the field of application of the system to be monitored, brightness oscillations, chemical pollutions or other variables may also be of importance. If one or more of these values lie beyond the predetermined tolerance zones, this may lead to interferences of the performance of the respective component, but also to a complete failure thereof. At worst, the failure of one individual component may lead to a collapse of the complete system.

Particularly in case of larger computer or processor systems, as for example mainframe computers or multiprocessor systems a continuous and faultless operation is of great importance and in particular as calculations on these devices often run over a very long period of time so that a failure of the system at a certain time probably ruins the work of several days. For this reason, temperature monitoring systems are known measuring the temperature at individual components of the system and when detecting an inadmissibly increased temperature switch off the respective component, for example, or—in case of a processor—effect a decrease of performance by means of reducing the clock frequency. In particularly critical cases a controlled shutdown of the complete system is effected.

It is the main object of the hitherto known monitoring systems to avoid a sudden collapse of the complete system due to a previous shutdown of individual components or the controlled shutdown of the system. This may avoid the loss of data, but often leads to a drastic reduction of the performance of the complete system, which often would not be necessary to this extent.

Hence it is the object of the present invention to provide a possibility of monitoring and controlling the operational performance of a computer or processor system, wherein the influence of a fault on the serviceability of the monitored system is reduced and the serviceability thereof is maintained or prolonged in case of controllable incidents. Active calculation processes as well as their data bases and results are to be protected to the greatest possible extent.

This object is solved by the method of claim 1 and the device of claim 4. According to the inventive method the operational parameters of individual components of the computer or processor system to be monitored as well as environmental parameters thereof are detected in a first step. In a second step the detected parameters and environmental parameters are compared with predetermined limit values. Thereby it is detected, if one or several of said detected operational parameters and environmental parameters have exceeded or fallen below of said predetermined limit values. Based upon these limit values that have been exceeded or fallen below of, a so-called operational event is determined in a next step, informing how and to which extent the system is affected by these faults. Then a reaction corresponding to the afore determined operational event is selected from a number of predetermined reaction patters and finally a control command for altering the operational performance corresponding to said reaction is transmitted to the computer or processor system to be monitored.

Hence, according to the invention a reaction is initiated in dependence upon the kind and intensity of a fault occurring in the system to be monitored, said reaction avoiding damages of components, assembly groups, devices and consequently of the computer or processor system as a whole, which would have occurred in cased of an unrestricted continuation of the operation. If the parameters lie beyond tolerable limit values a controlled shutdown of the complete system may be initiated. Moreover, there is the possibility of re-activating or running up individual components or even the complete system, if the fault has been removed or at least reduced.

Contrary to the hitherto known solutions for monitoring computer or processor systems the inventive method guarantees the continuation of the serviceability of the system with highest possible efficiency and simultaneous protection of the active computing processes. This is due to the fact that the individual components are monitored independently of each other by measuring sensors and that when predetermined limit values are reached a complete shutdown of the complete system and hence an interruption of the running programs does not have to be effected necessarily. Quite to the contrary, if justifiable, the individual components, assembly groups or devices are switched off individually or reduced in their performance, whereby the system as a whole, however, remains operable. Thereby, the predetermined reaction patters allow a fault-adequate reaction as well as specific monitoring and selecting of the individual components.

It is also an advantage of the present invention that in contrast to the hitherto known monitoring systems this system enables a complete monitoring of potential interferences within and outside the computer or processor system and not only a monitoring of the temperature. Thus, the interferences of too high air humidity, too low air flow, of dust or percussions may also be detected and taken into account. Further, the inventive method may be applied independent of buses and hence of producers in all kinds of systems, guaranteeing the highest possible amount of flexibility. This refers to already existing systems or computer or processor systems to be still produced.

According to an embodiment of the present invention the detected operational parameters or environmental parameters are not absolutely measured values but also temporal changes of these measured values. This offers the possibility to meet appropriate countermeasures. Thus, a very rapid temperature rise of a monitored component leads to another reaction than a merely moderate rise. It may furthermore be provided that besides the transmission of the control command corresponding to a selected reaction also a corresponding information signal is to be issued in an optical or acoustic form, in order to inform a service staff as soon as possible of place and reason of the fault. This information signal may also be the transmission of a SMS-message.

The device according to the invention for monitoring and controlling the operational performance on the one hand-comprises first sensors for detecting operational parameters and on the other hand second sensors for detecting environmental parameters of the system. A monitoring unit for comparing the detected operational and environmental parameters with limit values stored in a first storage as well as for detecting if one or several of the limit values have been exceeded or fallen below of, is further provided. Due to appropriate means an operational event message is generated on basis of the exceeding or falling below of said limit values and are transmitted to a control unit, selecting from another storage containing a number of predetermined reaction patterns a control command corresponding to said operational event message and transmitting same to said computer or processor system.

In a further embodiment the inventive device may comprise an acoustic or optical output means for outputting a message corresponding to the operational event message and/or the transmitted control command. Further, a transmitting device for communicating this message, for example in form of a SMS-message, may be provided. The independent control of the system is guaranteed in that the monitoring device is part of a computer which is separate from the system to be monitored.

Figure 2:
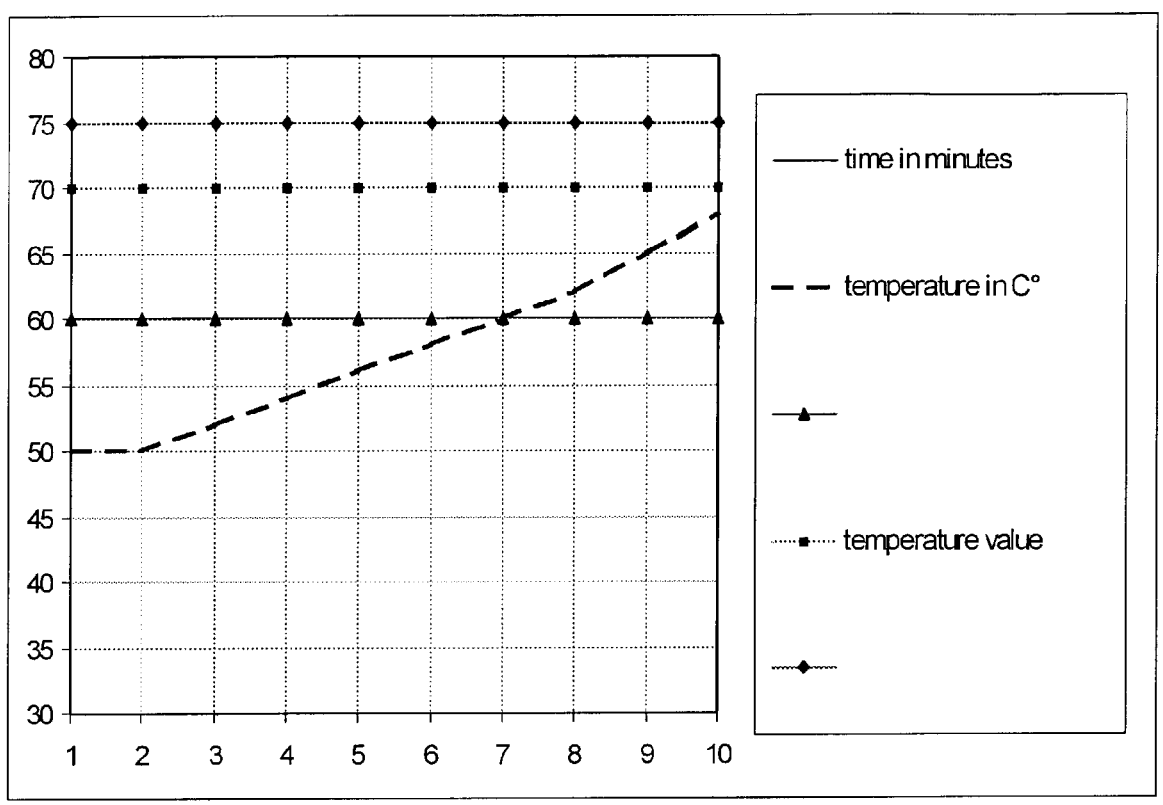
Figure 3:
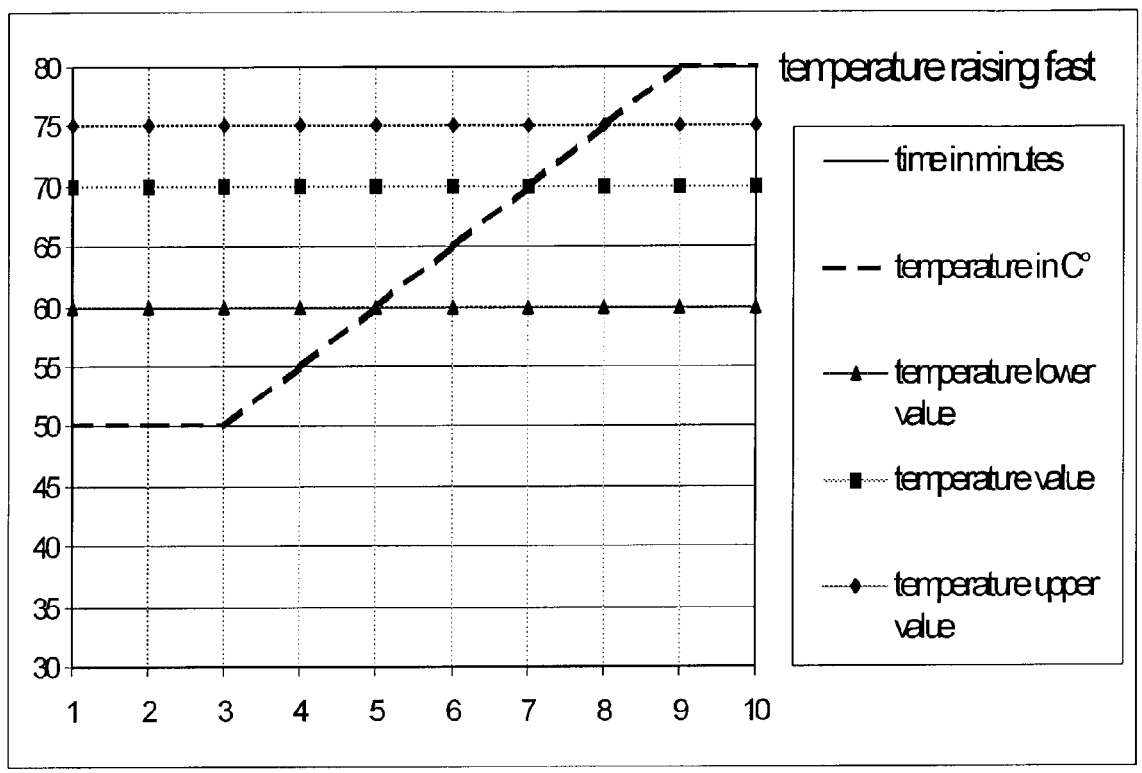
Figure 4:
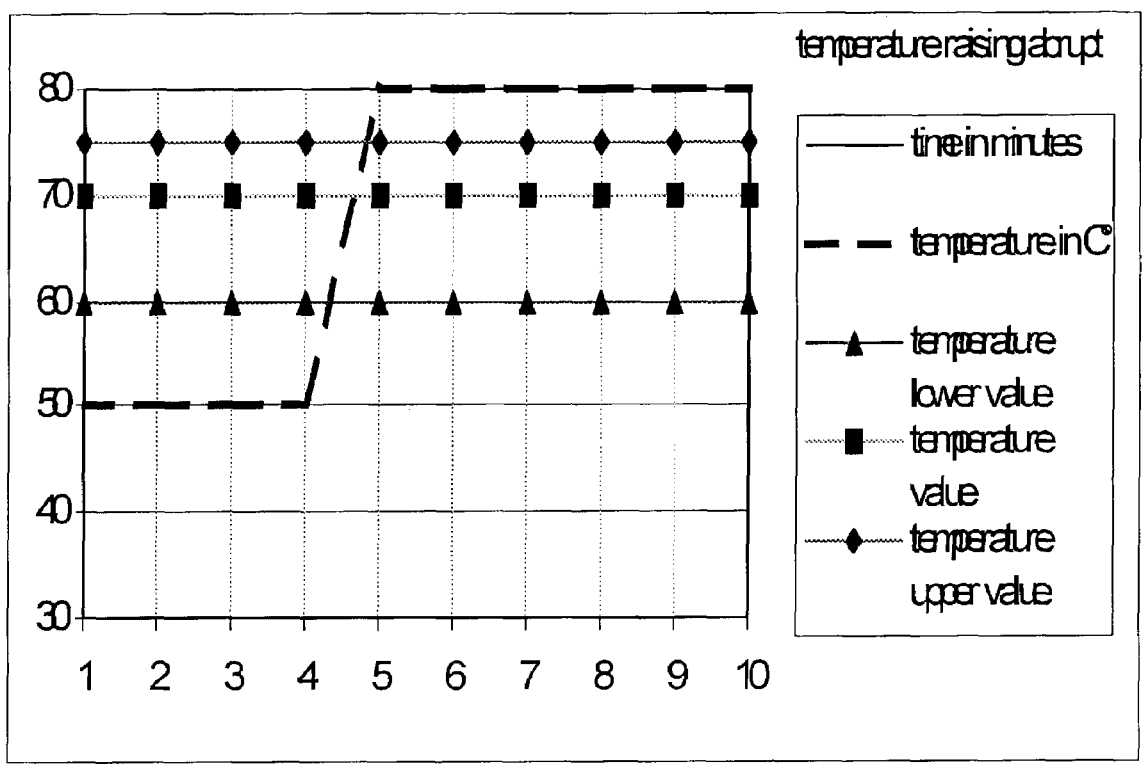

In the following the invention is explained in greater detail in the drawings:

FIG. 1 shows an inventive device for monitoring a computer system in a schematic view; and FIGS. 2 to 4 show different examples for explaining the reaction to the temperature rise of a component to be monitored.

FIG. 1 shows the monitoring of a mainframe computer 1 by an inventive monitoring device 2. Thereby, several first sensors 3 are arranged in said mainframe computer 1, detecting operational parameters of individual components or assembly groups of said mainframe computer and transmitting said data via respective lines 4 to said monitoring device 2. Said first sensors 3 are for example temperature sensors, but also sensors for detecting voltage fluctuations, percussions or other values which are relevant for the operation. Besides said first sensors second sensors are provided for detecting parameters in the environment of said mainframe computer 1, as for example sensors for detecting chemical pollutions of the air, dust or smoke, air humidity or in certain cases also of ionising radiation. These sensors may particularly be temperature sensors. The measured values detected by said second sensors are also transmitted via respective lines 6 to said monitoring device 2.

The operational and environmental parameters detected by said first and second sensors 3 and 5 first of all are being processed in a monitoring unit 7 of said monitoring device 2, whereby the detected values are compared to limit values, which are listed in a first memory 8. Thereby, it is not necessary to provide only one single limit value for each monitored value. Moreover, preferably several limit values, a lower, a mean as well as an upper limit value are provided so that it is possible to react specifically to the occurrence of a fault. When exceeding the lower limit value, for example, only a slight change of the operational performance of the computer system is necessary, whereas when the upper limit value is exceeded, this leads to a shutdown of the respective component or possibly even of the complete system.

If one or more of the limit values stored in said first memory 8 are exceeded or fallen below of, this is detected by said monitoring unit 7 and a corresponding operational event message is generated on basis of exceeding or falling below of the limit values, which then is communicated to said control unit 9. This operational event message informs about kind and extent of the fault. In the following the control unit 9 selects one control command corresponding to the operational event message from a number of predetermined reaction patterns contained in a second memory 10, and transmits said control command to the mainframe computer 1. This control command contains instructions for altering the operational performance and for example may be the instruction to shut down individual components or put them into a sleep modus or to reduce the capacity of the system. Furthermore, also the command to shut down the complete system may be transmitted. Thereby, the reaction patterns are chosen such that the mainframe computer 1 and the programs running thereon may still continue under the new operational conditions predetermined by said reaction patterns, if this is justifiable.

Once the influence of the fault has been successfully removed or at least reduced, a control command transferred from said monitoring device 2 to said mainframe computer 11 may contain, however, to run up the system again and to re-activate components which have been shut down before. If the monitoring unit has generated an operational event message or the control unit has transmitted a control command, simultaneously a respective information signal may be transmitted to a transmission device 15 via a second output line 14. Then, for example, respective SMS-messages may be transmitted to the service staff by means of said transmission device 15. As an alternative there is also the possibility of applying an optical or acoustic output means instead of a transmission device.

Preferably, the complete monitoring device 2 is part of a computer which is separate from the monitored mainframe computer 1. The flexibility of the inventive device is guaranteed in that new limit values and new reaction patters may be inscribed into the two memories 8 and 10 via input lines 12 and 13. <this provides the possibility of a reaction to changes in the configuration of the system to be monitored at any time. This further provides the possibility of an isolated view not only of the performance of individual operational or environmental parameters, but to evaluate them in combination and to react accordingly. A slight temperature increase of a monitored component, for example, does not necessarily have to lead to a shutdown of this component, if an adjacent component shows a clearly increased temperature, as the reason for the temperature increase of said first component very likely is to be found in the severe overheating of the adjacent component. In such a case, it is first sufficient to only shut down the severely overheated component.

Based on the example of the monitoring of the temperature the functioning of the inventive method is to be described in an exemplary manner in the following. Particularly the temperature monitoring of the individual components is of increasing importance as due to the increase of performance and increase of packing density of the components, demanded by the market and related to the general development, lead to problems in controlling the temperature. FIGS. 2 to 4 show the temperature course of a component be monitored, for example a processor. In the present example three different limit values, a lower, a mean and an upper limit value are defined, causing different reactions when being exceeded or fallen below of. Furthermore, the example shown in FIGS. 2 to 4 not only refers to the absolute temperature value but also to the course of time.

In FIG. 2, for example, a moderate temperature increase is detected for the monitored time, during the course of which merely the lower limit value is exceeded. Thus, if the lower limit is exceeded, first only the performance of the monitored processor is reduced, for example by reducing the clock frequency. As an alternative, however, also the performance of a respective refrigerating set may be increased. If these measures are successful, the system may be continued to be operated in this mode until the service staff arrives, who has been informed by a message transmitted simultaneously by means of the respective control command. A shutdown of the component or of the complete system is not necessary in this case.

In case of a faster temperature rise, as for example shown in FIG. 3, the afore described measures do not lead to success and in the course of time also the other two limit values are exceeded. When the upper limit value is exceeded, at the latest a shutdown of the monitored processor has become necessary. If, due thereto, the temperature falls below the predetermined limit values again, the complete system may be continued to be operated with shutdown processor until the arrival of the service staff. If, however, the shutdown of the processor does not lead to a temperature decrease either—for example within a predetermined time limit—it is safer to run down the complete system by means of the shutdown procedure, in order to store the already existing data.

An abrupt temperature rise, as shown in FIG. 4, however, is indicative of an extraordinary fault demanding the immediate shutdown of the complete system in any case. Due to the severe temperature rise the exceeding of further limit values it is not to be waited for, but the shutdown is to be initiated immediately.

The consideration of a time variations of a monitored parameter may, for example, also be effected by a separate sensor, exclusively detecting the variations of the monitored values. There is another possibility in detecting the time points at which certain limit values are exceeded or fallen below of and, on basis thereof, drawing a conclusion concerning the time behaviour.

According to the invention also a number of other values of measurement besides the temperature may be monitored. Thereby the respective reaction pattern not only depends upon the measured value itself, but also on the respective place of measurement. A number of possible reaction patterns is enlisted in the following table. Therein GW describes a parameter to be monitored, the exceeding of which leads to a shutdown of the respective component or that it is put into a sleep modus. The definition of one single limit value is sensible in cases where the respective component either should be fully operating or not operating a all. In other cases preferably several limit values are defined, i.e. a lower, a mean and an upper limit value, in order to be able to react in a graded manner.

TABLE

REACTION PATTERNS

| Measured values | Place of measurement | | Reaction pattern (exemplary) | |
|---|---|---|---|---|
| 1. temperature | a) | at the individual component or at a device | e) | GW: shutdown of the individual component, the device (sleepmodus) |
| | b) | at the air inlet | f) | IGW: reduce system performance |
| | c) | outside computer housing in the room | | mGW: switch off ventilator uGW: controlled system shutdown |
| | d) | external, e.g. adjacent rooms fire-alarm etc. | g) | same as b) |
| | | | h) | fixed to local facts |
| 2. air humidity | a) | at the individual component or at a device | d) | GW: shutdown of the individual component, the device (sleepmodus) |
| | b) | at the air inlet | e) | IGW: reduce system performance |
| | c) | outside computer housing in the room | | mGW: switch off ventilator uGW: controlled system shutdown |
| | | | f) | same as b) |
| 3. percussion (acceleration of frequency) | a) | at the individual component or at a device | c) | GW: shutdown of the individual component, the device (sleepmodus) |
| | b) | at the computer housing | d) | IGW: rotating devices (e.g. hard disks) shutdown uGW: controlled system shutdown |
| 4. air flow | a) | at the individual component or at a device | c) | GW: shutdown of the individual component, the device (sleepmodus) |
| | b) | at the air outlet | d) | IGW: reduce system performance uGW: controlled system shutdown |
| 5. dust, smoke, aerosol (e.g. optoelectronical measurement) | a) | at the air inlet | c) | IGW: reduce system performance |
| | b) | outside computer housing in the room | | mGW: switch off ventilator uGW: controlled system shutdown |
| | | | d) | same as a) |
| 6. chemical pollution of the air (e.g. electrical conductibility of the air, ph-value) | a) | at the individual component or at a device | d) | GW: shutdown of the individual component, the device |
| | | | e) | IGW: reduce system performance |
| | b) | at the air inlet | | mGW: switch off ventilator |
| | c) | outside computer housing in the room | f) | uGW: controlled system shutdown |
| | | | g) | same as b) |
| 7. electro-magnetic-field | a) | at the individual component or at a device | c) | GW: shutdown of the individual component, the device |
| | | | d) | IGW: reduce system performance |
| | b) | outside computer housing in the room | | uGW: controlled system shutdown |
| 8. voltage oscillation | a) | at the individual component or at a device | c) | GW: shutdown of the individual component, the device |
| | | | d) | (in case of no UPS:) |
| | b) | main voltage | | IGW: reduce system performance uGW: controlled system shutdown |
| 9. brightness oscillation | a) | at the individual | b) | (relevant for optoelectronic components |

TABLE-continued

REACTION PATTERNS

| Measured values | Place of measurement | | Reaction pattern (exemplary) | |
| --- | --- | --- | --- | --- |
| (optoelectronic) | | component or at a device | | GW: shutdown of the individual component, the device |
| 10. ionised radiation (X-ray radiation, radio-active radiation) | a) | at the individual component or at a device | c) | GW: shutdown of the individual component, the device |
| | b) | outside computer housing in the room | d) | IGW: reduce system performance uGW: controlled system shutdown |
| 11. further measurements to be defined | | ./. | | ./: |

GW = limit value
IGW = lower limit value
mGW = mean limit value
uGW = upper limit value Thereby, the monitoring of temperature is not only possible at the individual components but for example also at an air intake channel of the system, outside the system, in a room and in adjacent rooms. A change of temperature at the air intake channel may, for example, result in a change of the behaviour of the ventilator, as may be seen from the table.

Another parameter which is essential for the operational behaviour is the air humidity, which again may be detected at the element itself but also at the air intake channel or outside in the room. Here, an increased air humidity at the air intake channel may lead to the fact that first the system performance is reduced or the ventilator is switched off. Only as the upper limit value is exceeded, the system has to be shut down in a controlled manner for safety reasons.

Percussions occurring inside or outside the system may also be monitored and therefore rotating elements like disk drives could be shut down, if justifiable. If, however, the percussions become too severe, a controlled shutdown of the system is necessary. Further parameters to be monitored may be the air flow the contents of dust, smoke or aerosols as well as chemical pollutions of the air. Again, a simple measure may be to initially shut down the ventilator. If this does not lead to a success and if an upper limit value is exceeded, the consequence is a system shutdown.

Furthermore, the electromagnetic field intensity or voltage oscillations may be monitored. If optoelectronic components are used, brightness oscillations may further be taken into account. Finally, if necessary, the influence of ionising radiation may be taken into account in order to avoid any incidents.

It is the object of the inventive method to offer a maximum amount of flexibility and at the same time to enable an appropriate reaction to incidents of any kind. This offers the possibility to keep the system to be monitored operating while maintaining the largest possible performance.

The invention claimed is:

1. Method for an automated monitoring and controlling the operational performance of a computer or processor system (1) comprising the following steps:
   (a) detecting directly at least two parameters of individual components of the computer or processor system (1), wherein at least one of said individual components is ancillary to a processor of the computer or processor system, and wherein said at least two parameters are parameters that relate to failures of said individual components;
   (b) comparing the detected parameters with predetermined limit values;
   (c) determining, if predetermined limit values are exceeded or fallen below of by one or several of said detected parameters;
   (d) determining an operational event on basis of said limit values that have been exceeded or fallen below of;
   (e) selecting a reaction corresponding to said determined operational event from a number of predetermined reaction patterns, wherein said number of predetermined reaction patterns includes reactions that control individually each of a plurality of discrete components being monitored to maintain or prolong the serviceability of the monitored system and protect to the greatest possible extent active calculation processes as well as their data bases and results and to avoid damage to the discrete component being controlled by a reaction; and
   (f) transmitting a control command to alter the operational performance corresponding to said selected reaction to said computer or processor system (1).

2. Method of claim 1, characterized in that the detected parameters are absolute measured values as well as the temporal change of said measured value.

3. Method of one of the preceding claims, characterized in that besides the transmission of the control command corresponding to the selected reaction also a corresponding information signal is transmitted.

4. Method of claim 1 wherein said parameters comprise operational parameters.

5. Method of claim 4 further comprising the step of detecting at least two environmental parameters of environmental components.

6. Method of claim 1 wherein said parameters comprise environmental parameters.

7. A device for an automated monitoring and controlling the operational performance of a computer or processor system (1), comprising:
   first sensors (3) for detecting directly at least two parameters of individual components of said computer or processor system (1), wherein at least one of said individual components is ancillary to a processor of the computer or processor system, and wherein said at least two parameters are parameters that relate to failures of said individual components,
   a monitoring unit (7) for comparing said detected parameters with limit values stored in a first storage (8) as well as for detecting, if one or several limit values are being exceeded or fallen below of, means for generating a determined operational event message on basis of said limit values that have been exceeded or fallen below of, and a control unit (9) for receiving said operational event message as well as for selecting and transmitting a control command corresponding to said operational event message to said computer and processor system (1) from a storage (10) containing a number of predetermined reaction patterns, wherein said number of predetermined reaction patterns includes control commands that control a plurality of the individual components being monitored to maintain or prolong the serviceability of the monitored system and protect to the greatest possible extent active calculation processes as well as their data bases and results and to avoid damage to the discrete component being controlled by a control command.

8. Device of claim 7, characterized in that said detected parameters are absolute measured values as well as the temporal changes of said measured value.

9. Device of claim 8, characterized in that said device comprises a transmission means (15) for transmitting a message corresponding to said operational event message and/or to said transmitted control command.

10. Device of claim 9, characterized in that said device is part of a computer which is separate from the computer or processor system (1) to be monitored.

11. Device of claim 8, characterized in that said device is part of a computer which is separate from the computer or processor system (1) to be monitored.

12. Device of claim 7 or 8, characterized in that said device further comprises an optical or acoustic output means for outputting a message corresponding to said operational event message and/or said transmitted control command.

13. Device of claim 12, characterized in that said device comprises a transmission means (15) for transmitting a message corresponding to said operational event message and/or to said transmitted control command.

14. Device of claim 13, characterized in that said device is part of a computer which is separate from the computer or processor system (1) to be monitored.

15. Device of claim 12, characterized in that said device is part of a computer which is separate from the computer or processor system (1) to be monitored.

16. Device of claim 7, characterized in that said device comprises a transmission means (15) for transmitting a message corresponding to said operational event message and/or to said transmitted control command.

17. Device of claim 16, characterized in that said device is part of a computer which is separate from the computer or processor system (1) to be monitored.

18. Device of claim 7, characterized in that said device is part of a computer which is separate from the computer or processor system (1) to be monitored.

19. The device as claimed in claim 7, wherein the device operates separately from the computer or processor system monitored by the device, such that the computer or processor system can be re-activated by the device after the computer or processor system has been shut down.

20. Method for an automated monitoring and controlling the operational performance of a computer or processor system (1) comprising the following steps:

(a) detecting directly at least two parameters of individual components of the computer or processor system (1), wherein at least one of said individual components is ancillary to a processor of the computer or processor system, and wherein said parameters are quantitatively measurable parameters, and wherein said at least two parameters are parameters that relate to failures of said individual components;

(b) comparing the detected parameters with predetermined limit values;

(c) determining, if predetermined limit values are exceeded or fallen below of by one or several of said detected parameters;

(d) determining an operational event on basis of a combined evaluation of said limit values that have been exceeded or fallen below of;

(e) selecting a reaction corresponding to said determined operational event from a number of predetermined reaction patterns wherein said number of predetermined reaction patterns includes reactions that control individually each of a plurality of discrete components being monitored to maintain or prolong the serviceability of the monitored system and protect to the greatest possible extent active calculation processes as well as their data bases and results and to avoid damage to the discrete component being controlled by a reaction; and (f) transmitting a control command to alter the operational performance corresponding to said selected reaction to said computer or processor system (1).

* * * * *

(12) EX PARTE REEXAMINATION CERTIFICATE (8875th)
United States Patent
Planki et al.

(10) Number: US 7,702,965 C1
(45) Certificate Issued: Feb. 28, 2012

(54) METHOD AND DEVICE FOR MONITORING AND CONTROLLING THE OPERATIONAL PERFORMANCE OF A COMPUTER SYSTEM OR PROCESSOR SYSTEM

(76) Inventors: Peter Planki, Munich (DE); Karl-Heinz Lettmair, Stoffen (DE)

Reexamination Request:
No. 90/011,518, Mar. 18, 2011

Reexamination Certificate for:
Patent No.: 7,702,965
Issued: Apr. 20, 2010
Appl. No.: 10/070,528
Filed: Dec. 2, 2002

(22) PCT Filed: Sep. 6, 2000
(86) PCT No.: PCT/EP00/08704
§ 371 (c)(1),
(2), (4) Date: Dec. 2, 2002
(87) PCT Pub. No.: WO01/18632
PCT Pub. Date: Mar. 15, 2001

(30) Foreign Application Priority Data

Sep. 6, 1999 (DE) .......................................... 199 42 430

(51) Int. Cl.
*G06F 11/00* (2006.01)

(52) U.S. Cl. ...................................................... 714/47.1
(58) Field of Classification Search ........................ None
See application file for complete search history.

(56) References Cited

To view the complete listing of prior art documents cited during the proceeding for Reexamination Control Number 90/011,518, please refer to the USPTO's public Patent Application Information Retrieval (PAIR) system under the Display References tab.

*Primary Examiner* — Adam Basehoar

(57) ABSTRACT

In order to monitor and control the operational performance of a computer system or processor system (1), operational parameters of individual components as well as environmental parameters of the computer system or processor system (1) are detected. Said parameters are compared with predetermined limit values. If it is determined that one or more of the detected operational parameters and environmental parameters have exceeded or fallen below of the predetermined limit values, an operational event is determined based on the limit values that have been exceeded or fallen bellow of. A reaction is selected from a number of predetermined reaction patters according to the determined operational event, and a control command which corresponds to this reaction and which is provided for altering the operational performance is transmitted to the computer to be monitored. This enables an early detection of the occurrence of faults as well as the initiation of an appropriate measure.

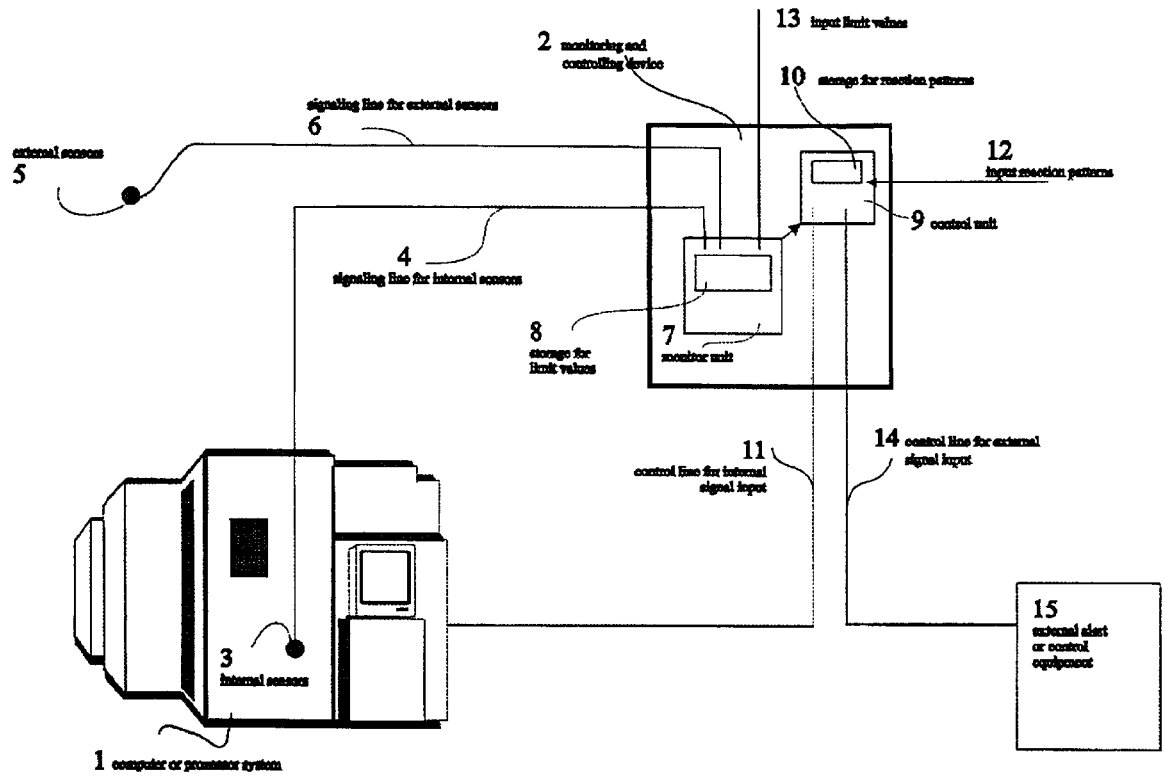

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *